(No Model.) 2 Sheets—Sheet 1.

E. N. BARBER.
SPEED INDICATOR.

No. 398,929. Patented Mar. 5, 1889.

WITNESSES:
Theo. G. Hoster
C. Sedgwick

INVENTOR:
E. N. Barber
BY Munn & Co.
ATTORNEYS.

(No Model.) 2 Sheets—Sheet 2.

E. N. BARBER.
SPEED INDICATOR.

No. 398,929. Patented Mar. 5, 1889.

WITNESSES:
Theo. G. Hoster.
C. Sedgwick.

INVENTOR:
E. N. Barber
BY Munn & Co.
ATTORNEYS.

UNITED STATES PATENT OFFICE.

EMMET N. BARBER, OF KENT, OHIO.

SPEED-INDICATOR.

SPECIFICATION forming part of Letters Patent No. 398,929, dated March 5, 1889.

Application filed May 24, 1886. Serial No. 211,748. (No model.)

*To all whom it may concern:*

Be it known that I, EMMET N. BARBER, of Kent, in the county of Portage and State of Ohio, have invented a new and Improved Speed-Indicator, of which the following is a full, clear, and exact description.

The object of my invention is to provide a new and improved speed-indicator especially adapted to indicate the speed of a rotating shaft, the speed of a locomotive, or the speed of a moving vehicle.

The invention consists of a compartment in which operates a piston actuated by the pressure of a continuous stream of a fluid forced into the said compartment by a suitable device actuated by the moving part the speed of which is to be indicated, of a second compartment filled with the same fluid and in which operates a piston which compels the other piston to change its position slowly, and of a dial and pointer operated from the main shaft.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
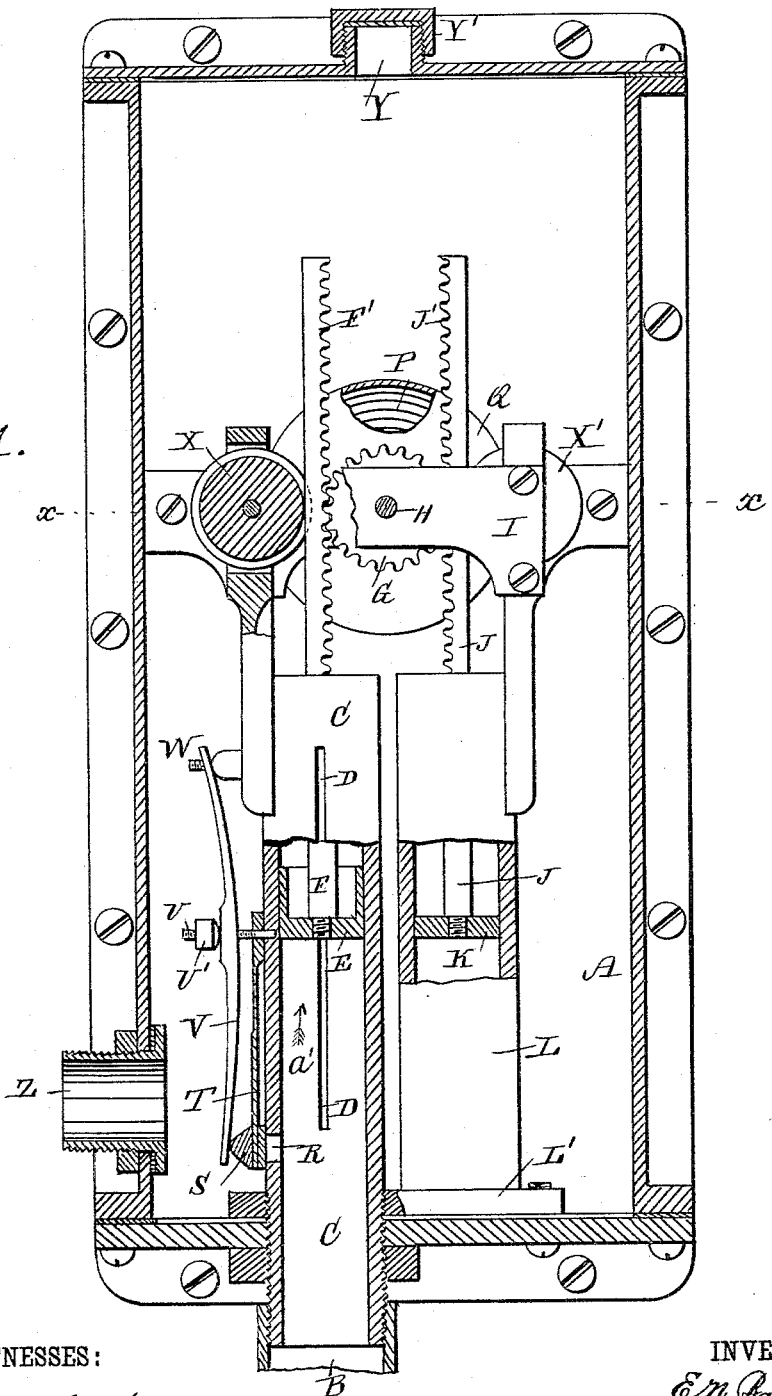
Figure 2:
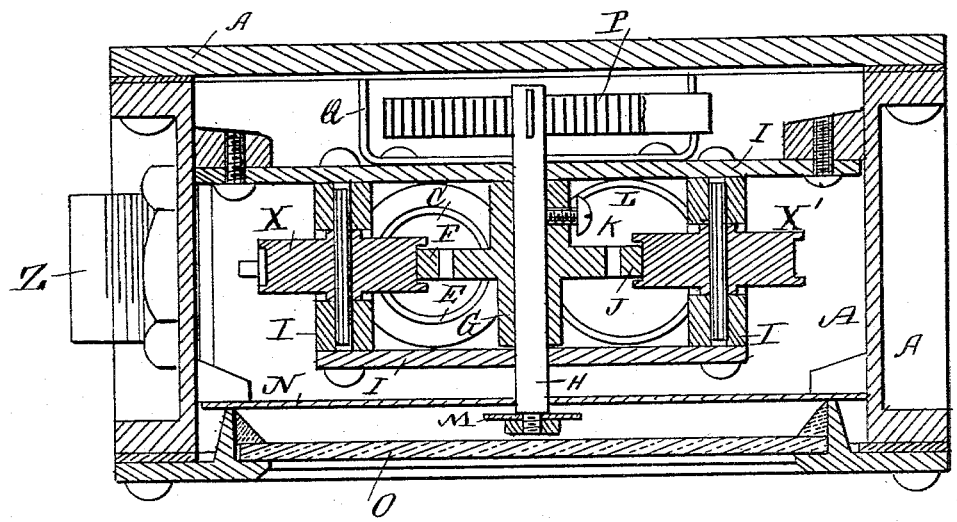
Figure 3:
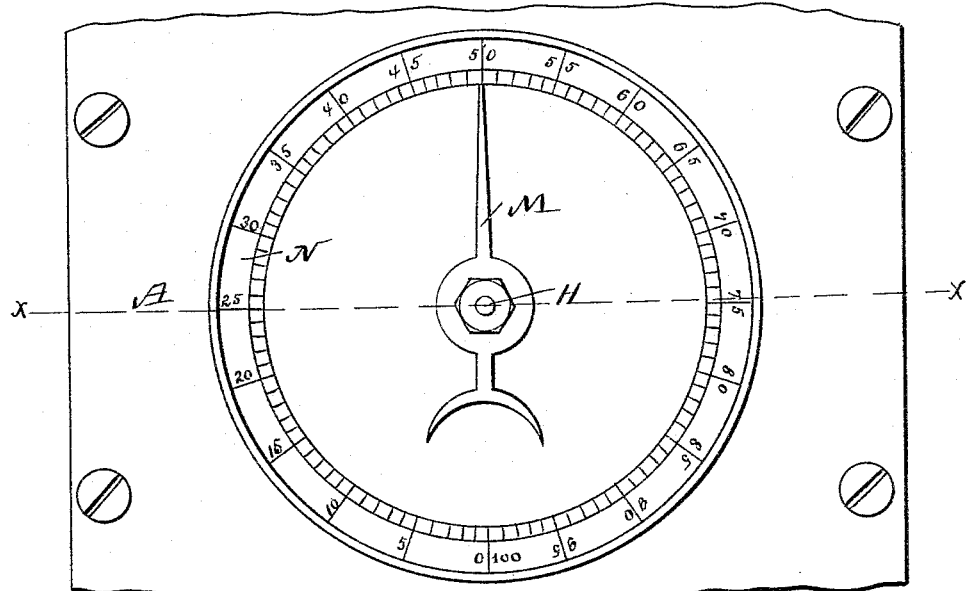

Figure 1 is a sectional front elevation of my improved indicator. Fig. 2 is a section plan view of the same on the lines $xx$ of Figs. 1 and 3; and Fig. 3 is a front view of the casing, dial, and pointer.

To the steam-tight casing A, of suitable size and construction, is attached the inlet-pipe B, which opens at its upper end into the tube C, provided with one, two, or more slots, D, which establish a connection of the interior of the cylinder C with the interior of the casing A. In the tube C operates a piston, E, provided with the piston-rod F, having rack-teeth F', which mesh into the gear-wheel G, secured to the main shaft H, having its bearings in a suitable frame, I, attached to the casing A. The gear-wheel G also meshes into the rack-teeth J', formed on the piston-rod J, which carries a piston, K, fitting loosely in the chamber L, having a base-plate, L', secured to the casing A.

The shaft H is provided on its front end with a pointer, M, indicating on the graduated dial N, which, with the glass cover O, forms a compartment in which the pointer M operates. To the rear end of the shaft H is secured one end of a coiled spring, P, which has its other end secured to the casing Q, in which the spring P is placed, and which casing is secured in any suitable manner to the frame I.

A short distance below the lower ends of the slots D is an aperture, R, in the side of the tube C, which is covered on the outside by a valve, S, attached to the spring-bar T, secured to the cylinder A.

On the screw U is held the spring-plate V, which rests with one end on a projection on the valve S, and with its other end is held on a pin, W. A nut, U', screws on the screw U and onto the plate V, thereby regulating the pressure of the valve S.

The piston-rods F and J are each guided by a flanged pulley, X or X', respectively, having bearings on the frame I and placed in line with the shaft H.

The casing A is provided on its top with an opening, Y, which can be closed by a screw-cap, Y'. An outlet, Z, is attached to the casing A near its lower end.

The operation is as follows: This indicator operates on the same principles which are stated in my other application (Case A) on the same subject, and filed with the present case, B, and numbered 211,747. To operate this indicator, any well-known mechanical means may be used to force a continuous stream or volume of fluid, which is properly connected with the moving part of the machine the speed of which is to be indicated, in such a manner that the volume of fluid discharged will increase or diminish as the speed of the moving part of the machine increases or diminishes. The pipe through which the fluid is discharged from the pump or forcing mechanism is connected with the supply-pipe B of the indicator, and the fluid is returned from the casing A to the pump or forcing mechanism by the pipe Z and proper connections, so that the pipes, the casing A, and the several compartments of the indicator are completely filled with the fluid employed, so as to form a continuous circuit. The fluid from the pump or forcing mechanism enters through the pipe B and passes into the tube C and presses against the piston E in the direction of the arrow $a'$ against the coiled spring P, and then passes out the cylinders C through the slot or slots D and returns to the pump by means of the pipe Z. The piston C continues to move in the direction of the arrow $a'$ as long as the pressure from the pump or forcing mechanism exceeds the pressure of the spring P, and the piston E remains stationary as soon as the pressure of the fluid and the spring P are equal, or as soon as the portion of the slot or slots D (uncovered by the piston E) corresponds with the volume of fluid which the pump is discharging, and which volume of fluid passes through the slots D at the pressure exerted by the spring. Thus an increase or decrease of the speed of the machine to which the indicator is attached causes a corresponding increase or decrease in the length of travel of the piston E. The movement of the piston E is consequently indicated by the pointer M, attached to the main shaft H, and the speed of the moving part can thus be seen at a glance by reference to the dial M.

It will be seen that the inertia of the fluid and of the moving parts themselves and their momentum would carry the piston E beyond the point at which it should stop, and it would be again forced back to its former position by the spring. To overcome this vibrating motion I operate the piston K in the cylinder L from the main shaft H by means of the gear-wheels G, meshing into the teeth J' of the piston-rod J, and the fluid in the casing A exerts against this piston K a pressure equal to that exerted against the piston E whenever the latter attempts to move quickly, and thus prevents any quick or rapid change in the position of the moving parts.

If from a sudden increase of speed the pressure of the piston K against the fluid exceeds its prescribed limits, then the valve S opens the aperture R, and thus permits the fluid to pass from the tube C into the interior of the casing A until the moving parts have had time to change their position. The pressure of the valve S can be increased or diminished by adjusting the nut U' against the spring-plate V.

The two pistons are made to exactly balance on the main shaft to prevent tendency to vibrate from jars, &c. These slots may be made tapering, if desired, as in case A, filed herewith.

Having thus fully described my invention, what I claim as new, and desire to secure by Letters Patent, is—

1. In a speed-indicator, the combination, with a casing and a slotted tube connected to the supply-pipe, of a piston in said tube provided with a toothed piston-rod, a gear-wheel meshing with the said toothed piston-rod, and a spring to actuate the shaft of said gear-wheel backward, substantially as described.

2. In a speed-indicator, the combination, with a casing and a tube connected to the supply-pipe and provided with one or more longitudinal slots, of the piston in the said tube, the piston-rod F, having teeth F', the shaft H, the gear-wheel G on the shaft H, the spring P on said shaft, the pointer M, and the dial N, substantially as described.

3. The combination, with a chamber with which the supply-pipe communicates, provided with one or more discharge-openings, of an adjustable relief or safety valve covering another separate and distinct opening from the said chamber, substantially as described.

4. In a speed-indicator, the combination of a casing, a tube or pipe connected to the supply-pipe, projecting into the said casing and provided with an aperture within the said casing, and an adjustable valve for closing the said aperture, substantially as described.

5. In a speed-indicator, the tube C, having one or more slots, D, the piston E, the piston-rod F, having rack-teeth F', the gear-wheel G, and the shaft H and the spring P, in combination with the piston-rod J, having rack-teeth J', the piston K, and the cylinder L, substantially as shown and described.

6. In a speed-indicator, the tube C, having one or more slots, D, the piston E, the piston-rod F, having rack-teeth F', the guide-wheel, the gear-wheel G, the shaft H, and the spring P, in combination with the piston-rod J, having rack-teeth J', the guide-wheel X', the piston K, and the cylinder L, substantially as shown and described.

7. In a speed-indicator, the tube C, having one or more slots, D, and the aperture, in combination with the adjustable valves S, substantially as shown and described.

EMMET N. BARBER.

Witnesses:
 A. E. ATKINS,
 I. D. TUTTLE.